US006967746B1

(12) United States Patent
Walker et al.

(10) Patent No.: US 6,967,746 B1
(45) Date of Patent: Nov. 22, 2005

(54) SYSTEM FOR COMBINING DEVICE COLOR PROFILES

(75) Inventors: Douglas G. Walker, Boston, MA (US); H. Scott Gregory, Jr., Bedford, MA (US); Robert F. Poe, Charlestown, MA (US); King F. Choi, Lexington, MA (US)

(73) Assignee: Eastman Kodak Company, Rochester, NY (US)

( * ) Notice: Subject to any disclaimer, the term of this patent is extended or adjusted under 35 U.S.C. 154(b) by 953 days.

(21) Appl. No.: 09/651,508

(22) Filed: Aug. 30, 2000

(51) Int. Cl.[7] .............................. G06F 15/00; B41B 1/00
(52) U.S. Cl. ........................................ 358/1.9; 358/1.15
(58) Field of Search .............................. 358/1.9, 1.15, 358/523, 538, 530, 445; 382/162, 165; 345/441; 715/745

(56) References Cited

U.S. PATENT DOCUMENTS

| 5,432,906 | A | | 7/1995 | Newman et al. |
| 5,857,063 | A | | 1/1999 | Poe et al. |
| 6,075,888 | A | * | 6/2000 | Schwartz .................... 382/167 |
| 6,108,008 | A | * | 8/2000 | Ohta .......................... 345/590 |
| 6,124,944 | A | * | 9/2000 | Ohta .......................... 358/1.9 |
| 6,307,961 | B1 | * | 10/2001 | Balonon-Rosen et al. .. 382/167 |
| 6,362,808 | B1 | * | 3/2002 | Edge et al. ................. 345/601 |
| 6,421,141 | B2 | * | 7/2002 | Nishikawa .................. 358/1.9 |
| 6,525,721 | B1 | * | 2/2003 | Thomas et al. ............. 345/594 |
| 6,542,634 | B1 | * | 4/2003 | Ohga .......................... 382/167 |
| 6,549,654 | B1 | * | 4/2003 | Kumada ..................... 382/162 |
| 6,650,771 | B1 | * | 11/2003 | Walker ....................... 382/162 |
| 6,671,067 | B1 | * | 12/2003 | Adam et al. ................. 358/1.6 |
| 6,680,740 | B2 | * | 1/2004 | Krueger ...................... 345/601 |
| 6,778,300 | B1 | * | 8/2004 | Kohler ........................ 358/529 |
| 6,781,716 | B1 | * | 8/2004 | Yoda .......................... 358/1.9 |
| 6,803,921 | B1 | * | 10/2004 | Balasubramanian et al. .......................... 345/597 |
| 6,809,833 | B1 | * | 10/2004 | Blair et al. ................. 358/1.16 |
| 6,836,345 | B1 | * | 12/2004 | Setchell ...................... 358/1.9 |
| 2001/0038468 | A1 | * | 11/2001 | Hiramatsu .................. 358/518 |

* cited by examiner

*Primary Examiner*—Madeleine Nguyen
(74) *Attorney, Agent, or Firm*—David M. Woods

(57) ABSTRACT

A system is described that uses [device>PCS] transformations for a source and destination device along with user preference information to create a composite [device>device] transformation which is used to convert a color in a source space from a source device into a color in a destination space provided to a destination device. The user preference information can be a default or extracted from an image or from the profiles involved or from a GUI. The system modifies the domain of the [device>PCS] transform from a destination device profile through the use of an ink manifold such that there are three input dimensions. The inking manifold can be an identity transform. The system also modifies the range of the [device>PCS] transform from a source device profile such that the PCS coordinates are all within the range of the modified [device>PCS] transform. The modified destination transform is inverted for values in the source transform domain to produce the [device>device] transform. The range of the [device>device] transform can be modified by applying the inking manifold transform to yield coordinates in the range of the destination device.

14 Claims, 2 Drawing Sheets

SYSTEM FOR COMBINING DEVICE COLOR PROFILES

FIELD OF THE INVENTION

The present invention is directed to a system that creates a device to device color transform from device to profile connection space transforms for source and destination devices and, more particularly, a system that uses user preferences concerning gamut mapping and colorant usage to create additional transforms that create a correspondence or mapping between dimensions or coordinates of source and destination device transforms so that they can be combined.

BACKGROUND OF THE INVENTION

The proliferation of digital imaging devices has created color reproduction problems. Because each device interprets digital color values differently, the color appearance of a given digital color specification (in RGB, CMYK, or some other color space) varies from device to device. With the advent of color management systems, such as the Kodak Color Management System available from Eastman Kodak Co., this problem has been addressed by storing information about device color reproduction in "device color profiles" and defining a device-independent "profile connection space" (PCS) with characteristics based on the properties of human color vision.

When a user wants to take a digital image from some source device (such as an RGB scanner) and print it on some destination device (such as a CMYK printer), the color management system (CMS) software converts the RGB source image into a CMYK destination image in a way that substantially preserves the color appearance of the image. This procedure relies on the availability of a device color profile (DCP) for both the source and destination digital color imaging peripheral. The DCPs are stored on the user's computer system in a file format understood by the CMS. A common file format for DCPs is that promoted by the International Color Consortium (ICC). An ICC profile for a given imaging device must contain a transform that converts device coordinates (such as RGB or CMYK) to device-independent PCS values. This transform will be referred to using the notation [device>PCS] and which can be called a forward transform for convenience. For output devices (such as printers) the ICC profile also must contain a transform that converts PCS values to device coordinates, that is, [PCS>device] and which can be called a backward or reverse transform.

Current color management systems convert from source device coordinates to destination device coordinates by using the [device>PCS] transform from the source device profile and the [PCS>device] transform from the destination device profile, that is, [device>PCS]□[PCS>device]. To decrease the amount of time required to process an image from the source space to the destination space, a CMS typically composes or combines the two transforms into a single transform that converts directly from the source device space to the destination device space ([device A>device B]). A method for composition is disclosed in U.S. Pat. No. 5,432,906, incorporated by reference herein. This method roughly halves the amount of time it takes to process an image from a source to a destination space.

While the above cited method is very efficient, it does have some potential drawbacks. First, because the PCS must accommodate any device that will be used, the PCS encoding encompasses a larger domain or gamut of colors than any real device, as a result, the [PCS>device] destination transform must compress colors that are outside the color gamut of the given source device. This "gamut compression" problem is difficult and there is no one solution that is ideal for all images or all users. ICC profiles attempt to address this problem by providing four different [PCS>device] transforms or "rendering intents" each with a different gamut compression. However, this still does not always give the user sufficient flexibility in choosing a suitable gamut compression. Furthermore, the "gamut compression" problem is really a "gamut mapping" problem from the source gamut to the destination gamut. Since the destination profile is typically computed without foreknowledge of the source device, the gamut compression technique is typically a generic one that will give typically acceptable results for a range of devices but which is not optimized for any single device.

Another problem with current techniques is that they go through an intermediary color space, the PCS. This offers the advantage of decoupling the source and destination profiles. It essentially reduces the number of profiles required for M source devices and N destination devices from M*N to M+N.

However, it can also create problems. Although the transformation from source device space to PCS may retain the color appearance information from the source device, it may lose other desirable information. Sometimes, it is desirable to preserve other aspects of the source device color encoding. One example is the desire that colors at the corners of the source device encoding (such as a pure red with no green or blue [255,0,0]) preserve this relationship in the destination device encoding. Another example is the desire to retain similar black ink usage when converting from one CMYK space to another (known as CMYK re-targeting). This device-specific information is typically discarded by the [device>PCS] transform.

One general approach to solving these problems would be to have the device profiles contain only color measurements from characterization targets produced on or scanned into the device. However, such an approach does not adequately account for the difficulty of producing a high quality [device>PCS] transform. To produce such a transform, one must build a model using the color measurements of the targets and the device code values used to produce the targets. The optimum form of such a model depends on the physics of the device being modeled, and there is not a single mathematical form suitable for all types of devices. Furthermore, if the analytical device model is to be converted into a multi-dimensional interpolation table, one must exercise care in the spacing of the lattice of points in the table so that linear interpolation in the table accurately predicts the analytical model. A much better approach is to have the device profiles contain [device>PCS] interpolation tables (as is, indeed, already commonly done in existing color management systems).

What is needed is a system that will allow a [device>device] transform to be created from a [source device>PCS] transform and a [destination device>PCS] transform.

SUMMARY OF THE INVENTION

It is an object of the present invention to create a device-to-device transform from device-to-profile-connection-space (PCS) transforms.

It is also an object of the present invention to allow transforms with different dimensions to be combined.

It is another object of the present invention to allow retargeting transforms to be created from the device to connection space transforms.

It is a further object of the present invention to provide a method of incorporating more specific user requirements into the process of building a [device>device] transformation, and thereby achieve higher color reproduction quality.

It is also an object of the present invention to incorporate user requirements or preference information such as inking selection and gamut compression into the process of building a device to device transformation. It is an additional object of the present invention to provide improvements in gamut mapping and in colorant usage.

It is an object of the present invention to also allow for more flexibility in the use of various color adaptation states for the profile connection space (PCS). The above objects can be attained by a system that uses [device>PCS] transformations for source and destination devices along with user preference information to create a composite [device>device] transformation which is used to convert a color in a source space into a color in a destination space. The system modifies the domain of the [device>PCS] transform from a destination device profile through the use of an ink manifold such that there are three input dimensions. The system also modifies the range of the [device>PCS] transform from a source device profile such that the PCS coordinates are all within the range of the modified destination [device>PCS] transform. The modified destination transform is inverted for values in the source transform range to produce the [device>device] transform. The range of the [device>device] transform can be modified by applying the inking manifold transform to yield coordinates in the range of the destination device.

These together with other objects and advantages which will be subsequently apparent, reside in the details of construction and operation as more fully hereinafter described and claimed, reference being had to the accompanying drawings forming a part hereof, wherein like numerals refer to like parts throughout.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
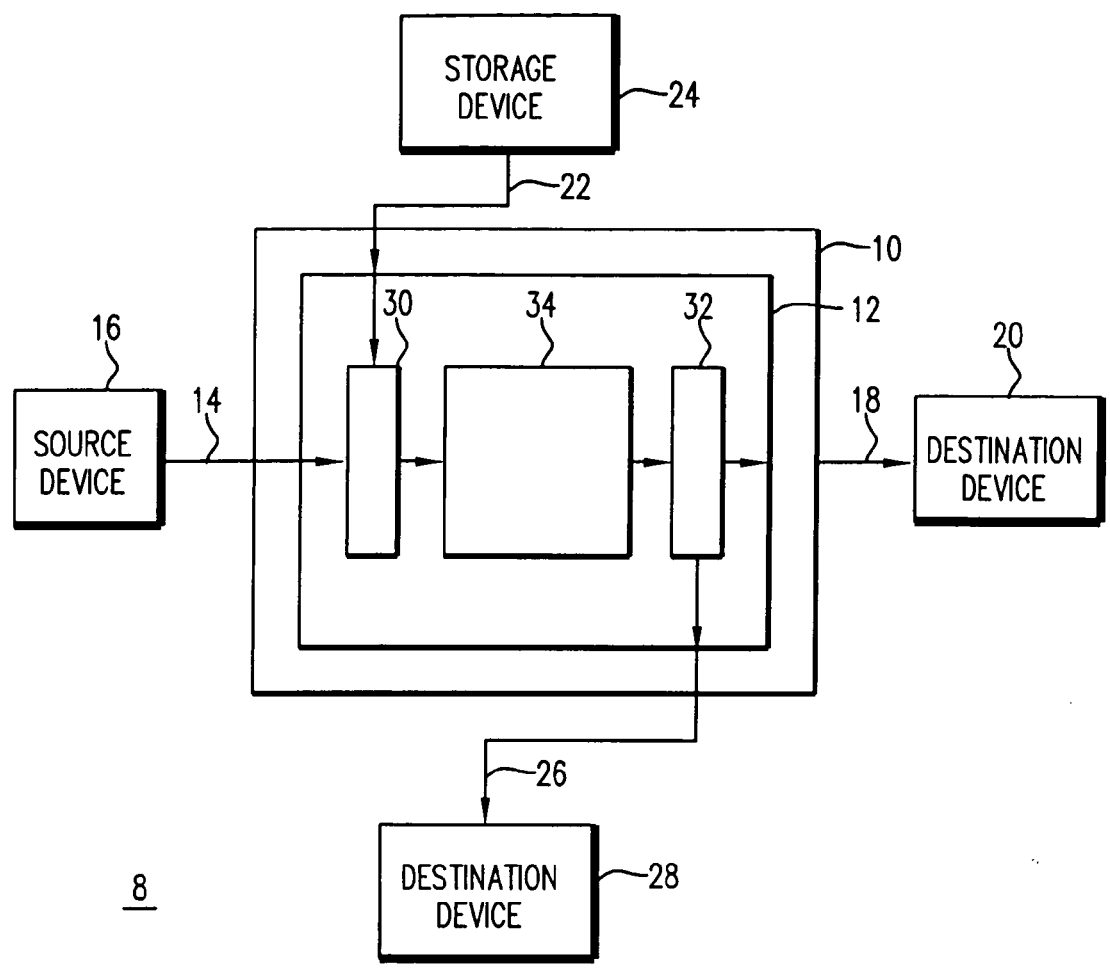
FIG. 1 depicts a system which can perform the processes of the invention to create a device to device transform and convert colors with the resulting device to device transform.

The present invention includes a method for computing a single transform from source device space to destination device space which does not rely upon the [PCS>device] transform from the destination profile. Instead, it uses the [device>PCS] transform from the destination profile along with information about the user's color reproduction preferences. While less efficient than the aforementioned technique using a pre-computed [PCS>device] transform with the composition method described in U.S. Pat. No. 5,432,906, the method makes up for this by providing superior color reproduction.

The problem of building a transform from source device coordinates to destination device coordinates is analogous to deciding what destination coordinate best maps to a given source coordinate. The main criteria for making this decision is preservation of color appearance although, as discussed above, there may also be device-dependent considerations. Furthermore, there is the need for gamut mapping to deal with the fact that both devices may represent colors that may not be represented by the other device. For example, a source device such as a CRT can represent in it's RGB device space yellows that cannot be printed on a typical printer. Conversely, the printer device space may represent cyans that cannot be represented by (or reproduced on) the CRT. These latter criteria are in the realm of user-preference and can vary from between users, between application areas, and even between images.

The criteria of preserving color appearance is enabled via use of the [device>PCS] transform from the source device profile since current color management systems all use a profile connection space based on human color vision (such as CIE XYZ or CIELAB). In other words, for any source device coordinate the color appearance of that coordinate may be computed using the transform [device>PCS]. The translation of this color appearance to destination device coordinates is facilitated by the [device>PCS] transform from the destination device profile. Calculating a device coordinate for a given color appearance involves inverting this transform. This inversion is complicated by the aforementioned gamut mismatch (implying that a requested PCS value may not have an inverse) and by the fact that some devices use more than three colorants (implying that, for N colorants, an additional N-3 pieces of information are necessary to calculate a unique inverse).

User preferences as to ink usage are used to resolve the under- determined nature of the inverse when there are more than three colorants. In CMYK printing this amounts to making a choice of what is referred to as gray component replacement or under-color removal (GCR/UCR). This information may be collected from the user via a graphical user interface (GUI) such as that used in the Color Profile Editor software available from Eastman Kodak Co. Alternatively, this information could be obtained from tags stored in the profile. These choices may be viewed as describing a transformation from three dimensions to N dimensions (where N is the number of colorants). In mathematical terms, this transformation is said to describe a three-dimensional subspace in the N-dimensional space, that is, an "inking manifold." Such a transformation can be used to reduce the [device>PCS] transform from N input dimensions to three using functional composition. The resulting transform has three input and three output dimensions and thus may be inverted uniquely. It may be thought of as a [device>PCS] transform for a virtual device having only three input variables instead of N. This transform is a modification of the destination device [device>PCS] transform based on user preferences for ink usage and is described in U.S. Pat. No. 5,857,063, incorporated by reference herein. We introduce the term "ink manifold" here as a short hand for a three-dimensional subspace of a N-dimensional colorant space.

Using an inking manifold is an excellent way to make the destination [device>PCS] transform invertible by modifying it so that it contains only three input dimensions, rather than N. However, this restricts the solution to a given subspace of the N-dimensional colorant space. In some applications, such as, the CMYK retargeting application, a single inking manifold cannot be used since the desired solution must range over the entire N-dimensional colorant space. This is because of the need to preserve the GCR/UCR and total area coverage (TAC) of an arbitrary input image. In these situations, the destination [device>PCS] transform is made invertible by adding additional output channels, so that there are N output dimensions, as well as, N input dimensions. In a CMYK retargeting application, for example, one additional output channel would be added that is simply an identity transform in the black colorant (so that the black ink usage is preserved).

Alternatively, a separate inking manifold may be used for each distinct value of black ink in the source [device>PCS] transform. Typically, there are a relatively small number of distinct levels, perhaps 8–32, so this does not pose an inordinate computational burden. In fact, the solution may often be computed more quickly since the transform to be inverted has 3 input and output dimensions rather than N.

User preferences as to gamut mapping are used to resolve the problem caused by differences between the source and destination gamuts. As in the case of ink usage, user preferences concerning gamut mapping may be obtained via a GUI or taken from tags stored in profiles. It is possible to define a gamut mapping transformation that maps any color in the source gamut to a color in the destination gamut. Such a transform can be represented as a [PCS>PCS] transformation. This transform may be combined with the source [device>PCS] transformation using functional composition to yield another [device>PCS] transform that only contains PCS values within the destination device color gamut. This transform is a modification of the source device [device>PCS] transform based on the destination device and user preferences for gamut mapping.

The modified source [device>PCS] transform may be used along with the modified destination [device>PCS] transform to solve the problem of determining a transformation from source device to destination device. This is because the modifications described above cause there to be a unique inverse in the modified destination [device>PCS] transform for every value produced by the modified source [device>PCS] transform. As a final step, the modified destination device coordinates are converted back to original destination device coordinates by applying the inking manifold transformation.

The present invention will now be described in more detail through presentation of a number of illustrations of creating the [source device>destination device] transform, a discussion of the process used to create the [source device>destination device] transform and a discussion of the hardware in which the invention can be implemented.

The present invention can be implemented in a system 8, such as, depicted in FIG. 1 in which a computer 10, such as, a workstation type computer, uses a transform 12 to map input color image data 14 from or for a source device 16, such as, an RGB scanner or CRT, into color output data 18 supplied to a first destination device 20, such as, a CMYK printer or display. The present invention can also retarget or map input data 22 from a storage device 24 which was produced for the first destination device 20 into output data 26 for a second destination device 28, such as, a CMYK printer that uses different inks than the first destination device. The computer 10, as will be discussed later herein in more detail, obtains device to connection space transforms for the source 16 and destination 20 devices and combines them into a device to device transform. The computer 10 can include computer readable storage, such as RAM, floppy and hard disks, CDs, etc., upon which the process of the present invention and the transforms used and created can be stored for execution or distribution. The processes and transforms of the invention can also be distributed over a network, such as, the Internet.

Device color profile formats, such as the ICC format mentioned above, typically represent transformations, such as a [device>device] transformation using a structure involving a series of one-dimensional 30 and 32 and multi-dimensional 34 interpolation tables as depicted in FIG. 1 and described in U.S. Pat. No. 5,432,906 or in the ICC Profile Specification from the International Color Consortium. This allows more flexibility than choosing any one type of analytic mathematical model, such as a multi-dimensional polynomial. In the subsequent discussion, it will be assumed that the transforms are represented using a multi-dimensional interpolation table of this sort. Specifically, a transform with N input dimensions (or channels) and M output dimensions (or channels) will typically include a set of N one-dimensional input tables, M N-dimensional grid tables, and M one-dimensional output tables. Also, it will be assumed that the profile connection space (PCS) is an encoding of the CIELAB color space.

In the first example, the source device is an RGB CRT display and the destination device is a CMYK printer. The goal is to build a single multi-dimensional transform that will convert RGB monitor values to CMYK printer values. Device Color Profiles for the two devices are opened or obtained by the software and the two [device>PCS] transforms are read into memory.

To build the [device>device] transform, it is necessary to invert the [device>PCS] transform for the destination device for each point in the source [device>PCS] transform. However, since there are four device channels (C, M, Y, K) and only three PCS channels (L, a, b), the inverse is underdetermined (in other words, the solution is not unique). To make the inverse unique, the method described in U.S. Pat. No. 5,857,063, may be used. An inking manifold transform is created, using the techniques described in the above-mentioned patent, to map three pseudo-colorant channels (C', M', Y') to the original colorant channels (C, M, Y, K). This transform is functionally composed with the destination [device>PCS] transform to create a modified [device>PCS] transform with three input and output dimensions (and hence a unique inverse).

The inking manifold is created based on user preferences for black ink usage (UCR/GCR) and total area coverage (TAC). Note that this step may slightly reduce the effective gamut of the destination device since the inking manifold will not contain values that exceed the TAC limit.

Although the inverse is unique, it may not actually exist for all PCS values contained in the source [device>PCS] transform. This is because the source device may be able to produce some colors that are outside of the color gamut of the destination device. Therefore, the source [device>PCS] transform must be modified so that the inverse both exists and is unique.

Since the domain of the source and destination [device>PCS] transforms includes the entire code value domain of the devices the range or output PCS values represent the entire gamut of colors that may be produced on the monitor and printer, respectively. This knowledge of the color gamuts is used to map each of the PCS values in the source device interpolation table to a color inside (or on the surface of) the destination device gamut. Algorithms for doing this gamut mapping are well-known in the art. Typically, gamut mapping algorithms also use some knowledge of user preference along with knowledge of the device gamut(s). For example, in some applications it may be more desirable to preserve saturation than to preserve hue of a mapped color, whereas in other applications, the opposite may be desired.

It is sometimes convenient to represent the gamut mapping transformation as a [PCS>PCS] interpolation table. The composition of the source [device>PCS] transform with the [PCS>PCS] transform is essentially a modified source device transform where the colors have been mapped to be within the gamut of the specific destination device. Doing this mapping with knowledge of both source and destination device gamuts often gives superior results than using the generic gamut mapping built into a typical [PCS>device] transform from the destination device profile.

The gamut mapping operation ensures that an inverse will exist and the inking manifold ensures that it is unique. Now the modified destination [device>PCS] transform is inverted for each value in the modified source [device>PCS] transform interpolation table. This may be done using any of a variety of well-known methods for inverting a function of several variables, such as the Newton-Raphson method.

The result of the inversion is a [device>device] interpolation table transform that produces modified destination device values [C', M', Y']. By composing the output of this transform with the inking manifold, the modified device values are converted into [C, M, Y, K] values for the destination device.

The resultant transform solves the original need for a single transform for converting the monitor RGB values into printer CMYK values. This is done while adhering to user preferences for gamut mapping and black ink usage, as well as substantially preserving color appearance. The resultant transform may be used to process image data and then discarded. Alternatively, it could be saved to a storage device (for example, as an ICC device link profile).

Figure 2:
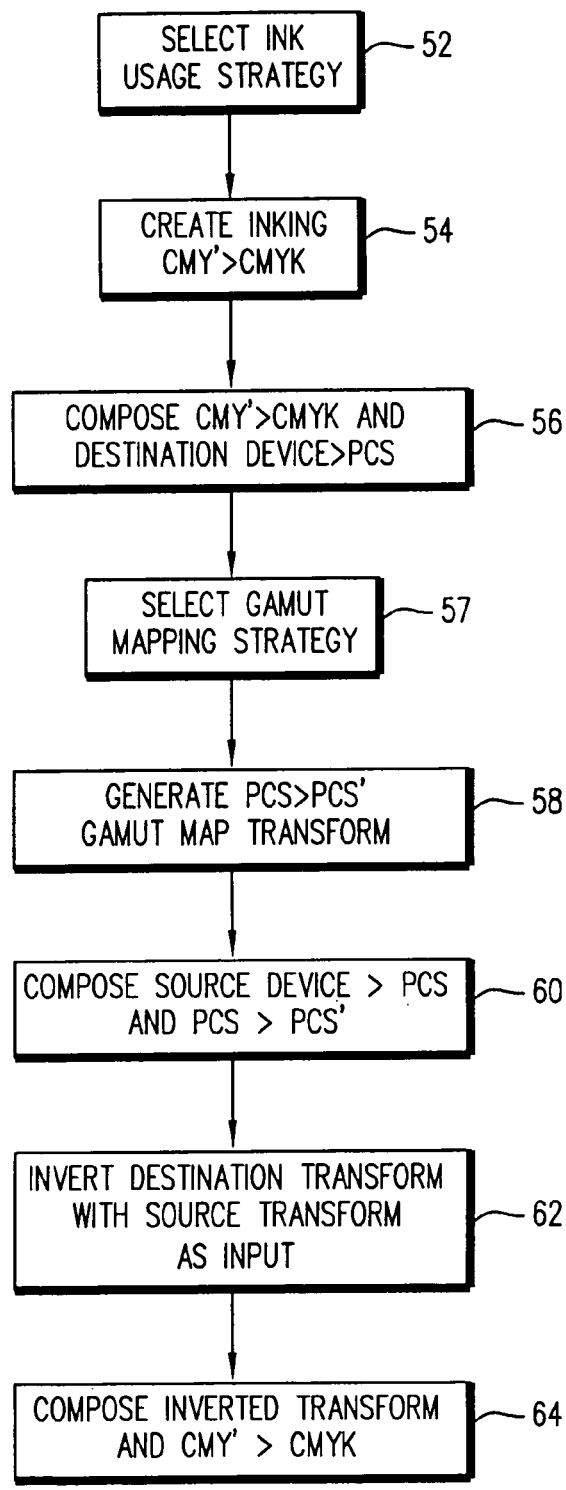
FIG. 2 illustrates the operations of the present invention.

The operations discussed above for the RGB to CMYK device to device transform are preferably done in an order as shown in FIG. 2 where the user is allowed to select 52 an ink usage strategy which involves choosing values for GCR and TAC. An inking manifold [CMY'>CMYK] is then created 54. The manifold is then composed 56 with the destination device to profile connection space transform [CMYK>PCS]. Then, the user selects 57 a gamut mapping strategy which will map the source gamut to the destination gamut. Note that the user need not be asked each time to do this selection if their preferences are already known. Next, the [PCS>PCS'] gamut mapping transform is generated 58. The transform for the source device to the profile connection space ([CRT RGB>PCS]) is composed 60 with the gamut mapping transform [PCS>PCS']. This modified destination transform is then inverted 62 using as input values coordinates of the modified source transform. The output is an inverted transform which is composed 64 with the manifold to create the desired device to device transform [CRT RGB>CMYK].

In the next example, a CMYK re-targeting transform is built. Such a transform converts CMYK values appropriate for a source device into CMYK values for a destination device with different color reproduction properties (for example, using different inks). CMYK re-targeting transforms are of two basic types. They will either replace the black ink usage of the source image with a fixed type of UCR/GCR and TAC, or they will preserve whatever black ink usage is present in a given image. Transforms of the first type may be built using the same procedure described above for building a monitor RGB to printer CMYK transform (simply replace the monitor [RGB>PCS] transform with the [CMYK>PCS] transform for the source device). This example shows how to use the invention to build a re-targeting transform of the second type.

The first step is to modify the [CMYK>PCS] transform of the destination device so that it has a unique inverse. This is done by creating a separate inking manifold for each distinct level of black ink in the source transform. Since the interpolation table for the source transform is typically defined over a lattice in the CMYK source space that has between 8 and 32 distinct levels of black, this is not computationally unreasonable. Say there are p distinct levels, then one applies the operations 54–64 of the preceding example p times, each with an inking manifold created in operation 54 customized for the given level of black. The inking manifolds are of a very simple structure where C= C', M=M', Y=Y', and K is fixed at the given distinct amount of black from the source transform.

In CMYK retargeting it is often useful to first correct for differences in dot gain between the two process. Thus, instead of preserving the exact amount of black in the source image, this is modified somewhat based on the difference in dot gain for black ink in the two processes such that the amount of source device black ink is replaced with the amount of destination device black ink with the same lightness. This correction may be represented as a one-dimensional look-up table that transforms the p source black levels to p destination black levels (see 54 of FIG. 2).

The composition of the inking manifold and the destination [device>PCS] transform causes the transform to have a unique inverse. The gamut mapping operation is done as in the previous example. The combination of inking manifold and gamut mapping cause the inverse to exist and be unique. The [CMYK>CMYK] transform is thus built up in p applications of the operations of the previous example.

As described above, an alternative embodiment for this example would invert a single transform with four input and output dimensions rather than p transforms with three input and output dimensions. In this scenario, no inking manifold is used. Rather, an additional output channel is added to both [device>PCS] transforms that simply passes through the amount of black ink (corrected for dot gain). The resulting transforms are [C,M,Y,K>L,a,b,K']. In general, the added channel could be any mathematical function of the source device code values (inks) that expresses inking preferences. For example, the added channel could be a function such as K-min(C,M,Y). This would cause the [device>device] transform to preserve the difference between black and the smallest of cyan, magenta, or yellow (as well as preserving the color appearance). Some care must be taken when choosing more general functions to insure that the resulting problem is invertible.

As another example, a transform is built by combining profiles from a source RGB scanner and a destination RGB monitor where the PCS values are for different viewing environments. Current color management systems typically use the concept of a reference viewing environment to communicate color appearance using color spaces, such as, CIE XYZ or CIE Lab which only describe whether two colors match and not how they appear. Since the changes in the viewing environment alters the appearance of a given XYZ or CIELAB value, current color management systems use a fixed viewing environment for the profile connection space. In this way, a source profile and destination profile may be used without the color management system having to translate colors between potentially different viewing environments.

Using the invention, a high quality [device>device] transform can be built even if the source and destination profiles use PCS values that are not relative to the same viewing environment. As long as the profiles adequately encode the parameters necessary to describe the viewing environment being used, the invention can incorporate the adaptive corrections along with the gamut mapping into the [PCS>PCS'] transform which is used to modify the range of the source transform as described above. For example, assume that the PCS values in the source device transform are CIELAB relative a 9300K white point whereas the PCS values in the destination device transform are relative to a 5000K white point. First, a [PCS>PCS"] transform would be generated that performs chromatic adaptation from 9300K to 5000K. Then, a [PCS">PCS'] transform is generated that performs a mapping from the source device gamut to the destination device gamut, both relative to a 5000K white point. The two transforms are then composed onto the end of the source [device>PCS] transform yielding colors that are in the gamut of the destination device and that are properly chromatically adapted.

The preceding examples have been described in the context of using the [device>PCS] transforms from source and destination profiles. It should be recognized that the device coordinates that make up the domain of these transforms need not correspond to any real physical device. Instead, they may be coordinates for a virtual device intended to approximate a class of real devices.

Also, while the PCS used in the above descriptions has been CIELAB, the invention works equally well with the many other connection spaces that can also be used to represent calorimetric quantities.

The many features and advantages of the invention are apparent from the detailed specification and, thus, it is intended by the appended claims to cover all such features and advantages of the invention which fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

The invention has been described with reference to a preferred embodiment. However, it will be appreciated that variations and modifications can be effected by a person of ordinary skill in the art without departing from the scope of the invention.

PARTS LIST 8 system
10 computer
12 transform
14, 22 input data
16 source device
18, 26 output data
20, 28 destination device
24 storage device
30, 32 one dimensional tables
34 multiple dimension tables
52–64 computer operations

What is claimed is:

1. A method comprising:
    obtaining a source device to profile connection space transform and a destination device to profile connection space transform;
    combining the source device to profile connection space transform and the destination device to profile connection space transform, thereby producing a device to device transform;
    operating on a file with the device to device transform, thereby forming a modified file; and
    outputting the modified file to the destination device;
    wherein said combining combines the destination device to profile connection space transform with an inking manifold matching input dimensions of the destination device to profile connection space transform with output dimensions of the destination device to profile connection space transform.

2. A method as recited in claim 1, wherein said combining modifies the source device to profile connection space transform with a source to destination gamut mapping transform.

3. A method as recited in claim 1, wherein the inking manifold controls ink utilization.

4. The method of claim 1, wherein the file is a digital image file.

5. The method of claim 4, wherein the modified file is displayed by the destination device.

6. A method of creating a composite transformation converting a color in a source space into a color in a destination space using [device>PCS] transformations for a source and destination device, comprising:
    modifying a domain of the [device>PCS] transform from a destination device profile with an ink manifold producing a modified [device>PCS] transform with three input dimensions;
    modifying a range of the [device>PCS] transform from a source device profile producing PCS coordinates all within the range of the modified [device>PCS] transform;
    inverting the modified destination [device>PCS] transform using values in the modified source [device>PCS] transform to produce a [device>device] transform;
    modifying a range of the [device>device] transform by applying the inking manifold transform to yield coordinates in the domain of the destination device, thereby producing a modified [device>device] transform; and
    using the modified [device>device] transform to convert a color in a source space input by a source device into a color in a destination space; and
    outputting the color in the destination space to the destination device.

7. A method as recited in claim 6, wherein user preference information, concerning one of the ink manifold and a gamut mapping, is one of a default and extracted from the profiles.

8. A method as recited in claim 6, wherein the inking manifold is the identity.

9. A method as recited in claim 6, wherein the [device>PCS] transformations are one of: tags in a profile; polynomials; and multi-dimensional interpolation tables.

10. A method as recited in claim 6, wherein the [device>device] transform is saved as a device link.

11. A method for producing a composite transform from one device A color space to device B color space ([device A>device B]), comprising:

modifying a [device A>PCS] where colors are within the range of the [device B>PCS] transform and account for non-colorimetric requirements;

modifying a [device B>PCS] making the [device B>PCS] invertible by adding additional output channels and adding equivalent output channels to the [device A>PCS] transform;

inverting the modified [device B>PCS] transform for each value in the modified [device A>PCS] transform, thereby forming an inverted [device B>PCS] transform;

using the modified [device>device] transform to convert a first color in device A color space into a second color in device B color space; and outputting the second color to device B.

12. A method as recited in claim 11, wherein the added output channels comprise a mathematical function expressing ink utilization preferences.

13. A method for producing a composite [device>device] transform from a source device color space to a destination device color space [device>device] transform, comprising:

modifying a destination [device>PCS] transform having a destination device color space to have a unique inverse producing a modified destination [device>PCS] transform;

modifying a source [device>PCS] transform to have a range contained in a range of the modified destination [device>PCS] transform;

inverting the modified destination [device>PCS] transform for each value in the modified source [device>PCS] transform, thereby forming a [device>device] transform;

converting contents of the resulting [device>device] transform back to the destination device color space, thereby producing a composite [device>device] transform; and utilizing the composite [device>device] transform to convert a color input from a source device to a color that is output to a destination device.

14. A method of creating a composite transformation converting a color in a source space from a source device into a color in a destination space for a destination device, comprising:

obtaining [device>PCS] transformations for a source and destination device each having multi-dimensional interpolation tables and obtaining user preference information extracted from the profiles;

modifying a domain of the [device>PCS] transform from a destination device profile with an ink manifold transform, thereby producing three input dimensions that are used to produce a modified [device>PCS] transform, where the inking manifold controls gray component replacement;

modifying a range of the [device>PCS] transform from a source device profile such that the PCS coordinates are all within the range of the modified [device>PCS] transform and are responsive to the user preference gamut mapping information;

inverting the modified [device>PCS] transform using values in the source transform range to produce a [device>device] transform;

modifying a range of the [device>device] transform by applying the inking manifold transform to yield coordinates in the domain of the destination device; and transforming an image from the source device into an image for the destination device using the [device>device] transform.

* * * * *